United States Patent
Hassan et al.

(10) Patent No.: US 8,135,384 B2
(45) Date of Patent: *Mar. 13, 2012

(54) POLICY ENFORCEMENT FOR MULTI-RADIO TRANSMISSION AND RECEPTION

(75) Inventors: Amer A. Hassan, Kirkland, WA (US); Deyun Wu, Sammamish, WA (US); Thomas W. Kuehnel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 717 days.

This patent is subject to a terminal disclaimer.

(21) Appl. No.: 11/998,199

(22) Filed: Nov. 29, 2007

(65) Prior Publication Data
US 2009/0141660 A1    Jun. 4, 2009

(51) Int. Cl.
*H04W 4/00* (2009.01)
(52) U.S. Cl. ......... 455/410; 370/310; 709/200; 709/203
(58) Field of Classification Search .............. 455/74, 455/552.1, 410; 370/204, 310; 709/200, 709/203
See application file for complete search history.

(56) References Cited

U.S. PATENT DOCUMENTS

| | | | |
|---|---|---|---|
| 6,243,580 B1 | 6/2001 | Garner | |
| 6,795,444 B1 * | 9/2004 | Vo et al. | 370/401 |
| 6,876,864 B1 | 4/2005 | Chapin | |
| 7,032,009 B2 * | 4/2006 | Dowling | 709/217 |
| 2005/0058153 A1 * | 3/2005 | Santhoff et al. | 370/466 |
| 2006/0046716 A1 * | 3/2006 | Hofstaedter et al. | 455/432.2 |
| 2006/0282497 A1 * | 12/2006 | Braun et al. | 709/203 |
| 2007/0072605 A1 | 3/2007 | Poczo | |
| 2007/0100981 A1 | 5/2007 | Adamczyk | |
| 2007/0133387 A1 | 6/2007 | Arslan | |
| 2008/0279128 A1 * | 11/2008 | Hassan et al. | 370/310 |
| 2009/0168701 A1 * | 7/2009 | White et al. | 370/328 |

FOREIGN PATENT DOCUMENTS

| | | |
|---|---|---|
| EP | 1437667 A1 | 7/2004 |
| KR | 2006-0066031 A | 6/2006 |
| WO | WO 2006091749 A2 | 8/2006 |
| WO | WO 2007/041531 A1 | 4/2007 |
| WO | WO 2007/127120 A2 | 11/2007 |

OTHER PUBLICATIONS

Filip Perich, "Policy-based Network Management for NeXt Generation Spectrum Access Control"; http://ieeexplore.ieee.org/ie15/4221461/4221462/04221534/pdf?arnumber=4221534; pp. 496-506.

(Continued)

*Primary Examiner* — Pierre-Louis Desir
(74) *Attorney, Agent, or Firm* — Wolf, Greenfield & Sacks, P.C.

(57) ABSTRACT

A process for controlling radio transmission and/or reception to enforce certain constraints with either single or multiple radio communication is disclosed. In one embodiment, the enforcement control may be by the corporate administrator (such as an Information Technology (IT) department) that is responsible for the company's wireless devices. In other embodiments, the enforcement control may be by a regulatory group having governmental control over wireless communication. In yet another embodiment, the enforcement control might be by a provider group, such as a provider of a local private or semi-private wireless network desiring certain controls over the users of the network.

17 Claims, 5 Drawing Sheets

OTHER PUBLICATIONS

Thomas W. Hazlett, "The Wireless Craxe, the Unlimited Bandwidth Myth, The Spectrum Auction Faux Pas, and the PUnchline to Ronald Coase's "Big Joke": An Essay on Airwave Allocation Policy", http://jolt.law.harvard.edu/articles/pdf/other/hazlettwebprep.htm; pp. 1-76.

ITU New Initiatives Workshop on the Regulatory Environment For Future Mobile Multimedia Services, "The Regulatory Environment For Future Mobile Multimedia Services" Document: MMS/04 Jun. 6, 2006, http://www.itu.int/osg/spu/ni/multimobile/papers/MMS_flexiblespectrumstudy_060606/pdf; pp. 1-52.

Wenyuan Xu, et al. "Trieste: A Trusted Radio Infrastructure For Enforcing SpecTrum Etiquettes"; http://www.winlab.rutgers.edu/~pkamat/TRIESTE_SDR2006.pdf; pp. 1-9.

Rainer Falk, et al., "Approaches for Secure SDR Software Download"; http://e2r.motlabs.com/dissemination/conferences/E2R_SDRF04_6.pdf.

* cited by examiner

POLICY ENFORCEMENT FOR MULTI-RADIO TRANSMISSION AND RECEPTION

BACKGROUND

Wireless technology for computing systems is constantly changing and evolving. New wireless protocols are released each year directed to solving new problems or more efficiently solving old problems. As new technologies are released implementing new protocols, demand grows for computing devices that support more and more protocols.

Devices capable of communicating using one or more wireless technologies are referred to as radios. In early radio implementations, support for more protocols required more hardware to support those protocols since each protocol depended on specific hardware—e.g., amplifiers, antennas, filters, etc.—for support. More hardware in turn required more space and more power, and possibly even more hardware to deal with signal interference between components.

Efficiency considerations have led to the development of new radio implementations that move some functions from being performed in hardware to being performed in software. These new implementations are known as software defined radio (SDR). In some cases, multiple wireless communication protocols can be supported by one set of hardware. Software defined radio relies on technology progress to determine what access can be enabled by the current operating system and hardware configuration. The capability of current technology has to be discovered, and saved in a User-Interface (UI), such as Windows®, prior to downloading/uploading schema description of the Standard of interest. Enterprises, service providers, and/or regulators can be concerned about transmission and reception of specific radios and may wish to control access using a radio. The disclosure addresses such control protocols that may arise in the use of SDR in radio transmission.

SUMMARY

Applicants have appreciated that as the reliance on SDR increases, numerous potential concerns may be encountered by enterprises owning the wireless devices, local host providers and regulators. Applicants have appreciated the desirability of providing the ability to control radio transmission and/or reception. In view of the foregoing, embodiments of the present invention are directed to a process for controlling radio transmission and/or reception to enforce certain constraints with either single or multiple radio communication. In one embodiment, the enforcement control may be by the corporate administrator (such as an Information Technology (IT) department) that is responsible for the company's wireless devices. In other embodiments, the enforcement control may be by a regulatory group having governmental control over wireless communication. In yet another embodiment, the enforcement control might be by a provider group, such as a provider of a local private or semi-private wireless network desiring certain controls over the users of the network. Any of these control schemes may be implemented singularly or in any suitable combination, as the present invention is not limited in this respect. Further, the enforcement control may be, in some instances, for a single radio communication or for multiple radio communication, as the present invention is not limited in this respect.

In one embodiment, a method of using an SDR-enabled wireless device is disclosed. The method includes initiating a request for wireless communication using the SDR and determining whether the requested wireless communication is allowed. The requested wireless communication is enabled when the requested wireless communication is within predetermined allowed criteria.

In another embodiment, a method of using an SDR-enabled wireless device is provided. The method includes communicating with a wireless network with a first SDR and thereafter initiating a request for simultaneous wireless communication using multiple SDRs. The method also includes determining whether the requested simultaneous wireless communication is allowed. The requested simultaneous wireless communication is enabled when the requested simultaneous wireless communication is within predetermined allowed criteria.

In still another embodiment, a computer system is provided. The computer system includes programmable circuitry and software encoded on at least one computer-readable medium to program the programmable circuitry to implement a software defined radio. A verification module is encoded to enable wireless communication when the wireless communication is within predetermined allowed criteria.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The present invention relates to methods and apparatus for control schemes for radio communication using Software Defined Radio (SDR) in a wireless device, e.g., a PC or handheld devices. In embodiments of the present invention, the enforcement control may be by the corporate administrator (such as an Information Technology (IT) department) that is responsible for the company's wireless devices, by a regulatory group having governmental control over wireless communication and/or by a provider group, such as a provider of a local private or semi-private wireless network desiring certain controls over the users of the network. Further, the enforcement control may be, in some instances, for a single radio communication or for multiple radio communication, as the present invention is not limited in this respect. In some instances, in addition to policy enforcement, a determination of system compatibility with SDR may be required. Co-pending U.S. patent application Ser. No. 11/635,869, filed, Dec. 8, 2006, titled, "System Capability Discovery for Software Defined Radio", and co-pending U.S. patent application Ser. No. 11/899,276, filed, Sep. 5, 2007, titled, "Simultaneous Wireless Support in Software Defined Radio", both of which are assigned to the assignee of the present application and which are hereby incorporated herein by reference in their entireties, are directed to such system compatibility checks.

Illustrative embodiments of the invention will now be described.

As discussed, there may be certain groups desiring to control the wireless communication. In one aspect, one group might be the company or corporation issuing the wireless device, such as a corporate Information Technology (IT) department primarily responsible with the company's computing devices.

Figure 1:
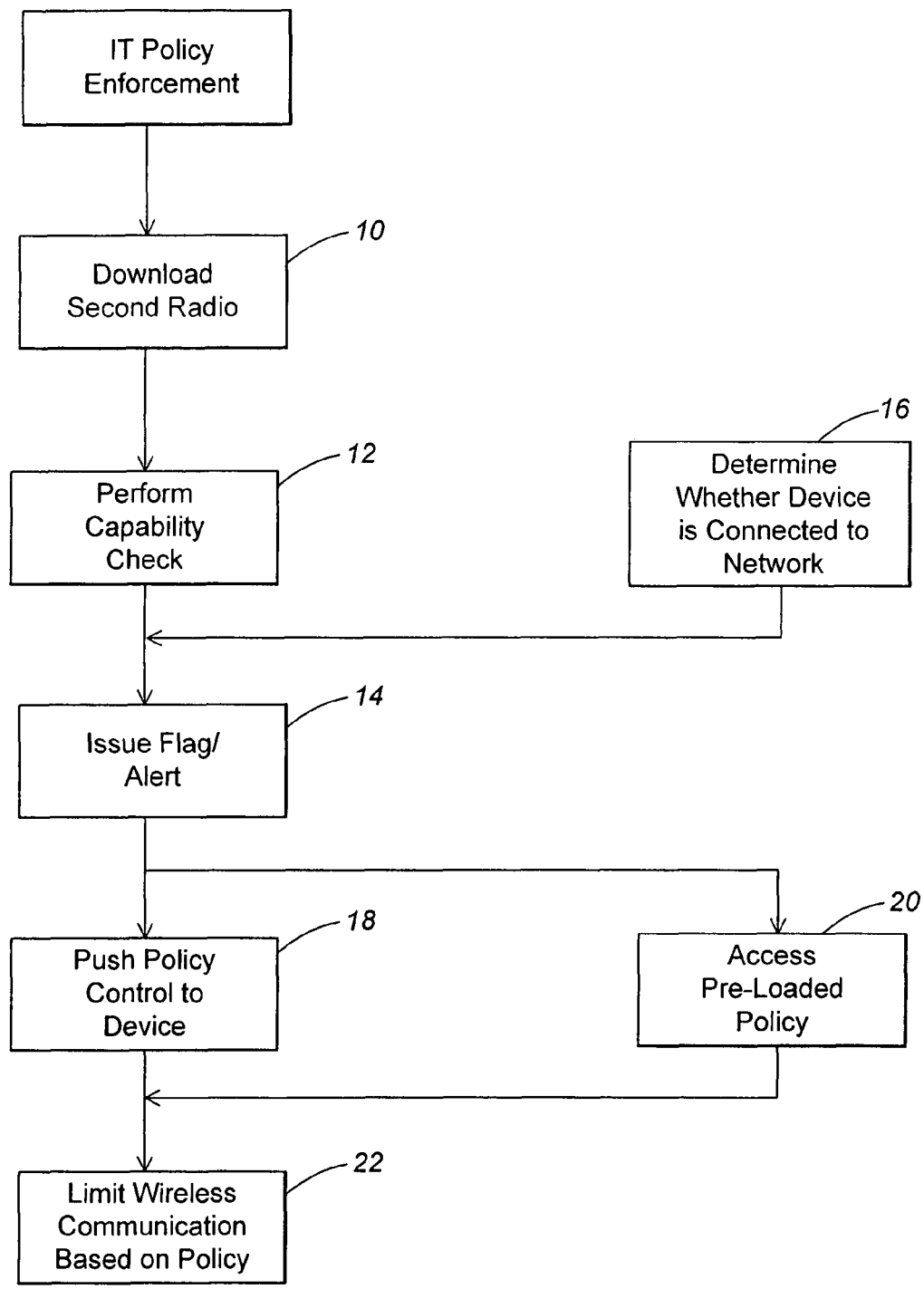
FIG. 1 is a flowchart of an illustrative process for IT policy enforcement.

In one embodiment, as shown in the exemplary process of FIG. 1, each wireless communication device includes a module or set of instructions that instruct the wireless device as to what radios and what kind of simultaneous radio the user is allowed to use at the same time. In some situations, the corporate IT administration group does not allow for specific simultaneous radio, for example, they may not allow a laptop to make a WiMax connection and simultaneously make a WiFi connection because this may create a problem known as multi-homing. Multi-homing can result in a third party accessing the data transfer causing a leak of information from one connection to another. Other reasons for writing multi-radio may be desired, as the present invention is not limited in this regard.

To manage the wireless services, the IT group thus can set the wireless communication device in a desired manner. In one embodiment, suppose a user desires to use simultaneous radio. The user may have only one wireless radio installed, but desires to download a second SDR. In this situation, as shown at Block 10 of FIG. 1, the user would download the second radio and may run the capability check(s) as shown at Block 12, as described in the above-identified co-pending US patent applications. Upon downloading or after the capability check, as shown at Block 14, a flag or alert may be given to the user indicating that simultaneous radio may not be allowed because of the constraints imposed by the IT group. The flag or alert may include a message such as, "Warning, the wireless communication you are attempting to use has been blocked. Please contact your IT Administrator."

In this case, the IT instructions to the user (via instructions to the wireless device) might be that the second radio is never allowed, that only certain communication protocols are allowed (e.g., Bluetooth is allowed but WiMax is not), or that the communication may be constrained in some manner (e.g., allowed at only certain times, bandwidths, power levels, etc.). Other suitable protocols and/or constraints may be implemented, as the present invention is not limited in this respect.

Further, the limitations on the wireless communication may be based on whether or not the wireless device is connected to the company's network, as shown in Block 16. In one embodiment, if connected to the company's network, then the above-mentioned limitations may be imposed. If the wireless device is not connected to the company's network, then no restrictions may be required. Other suitable connectivity limitations may be imposed by the IT group, as the present invention is not limited in this respect.

In one embodiment, the control server may be configured so that when the wireless device connects to the corporate network, the policy control is pushed down to the wireless device, as shown in Block 18. This may also be true in a situation where the wireless device is connected to the company's network via a virtual private network arrangement. Other suitable avenues for implementing the IT group's policy control on the wireless device may be employed, as the present invention is not limited in this respect. For example, the wireless device may be preloaded with the control policy instead of being pushed down when the wireless device connects to the network, as shown in Block 20.

The instructions either sent to or pre-installed on the wireless device may include a list of allowed wireless protocols and/or a list of blocked protocols. Software on the device may be employed to limit connectivity per the policy, as shown at Block 22. Other suitable arrangements for informing the user of the allowed and/or blocked wireless communication protocols may be employed, as the present invention is not limited in this respect.

Aspects of the invention are also directed to limiting wireless communication when the network provider is a local private or semi-private or public network. In this case, the control algorithm will prevent a user from sharing her wireless connection with another user. Suppose for example, the user is using a wireless protocol, such as wideband CDMA or WiMax, and the provider of this service wants to prevent the user from sharing this service out to friends, family members, etc.

Figure 2:
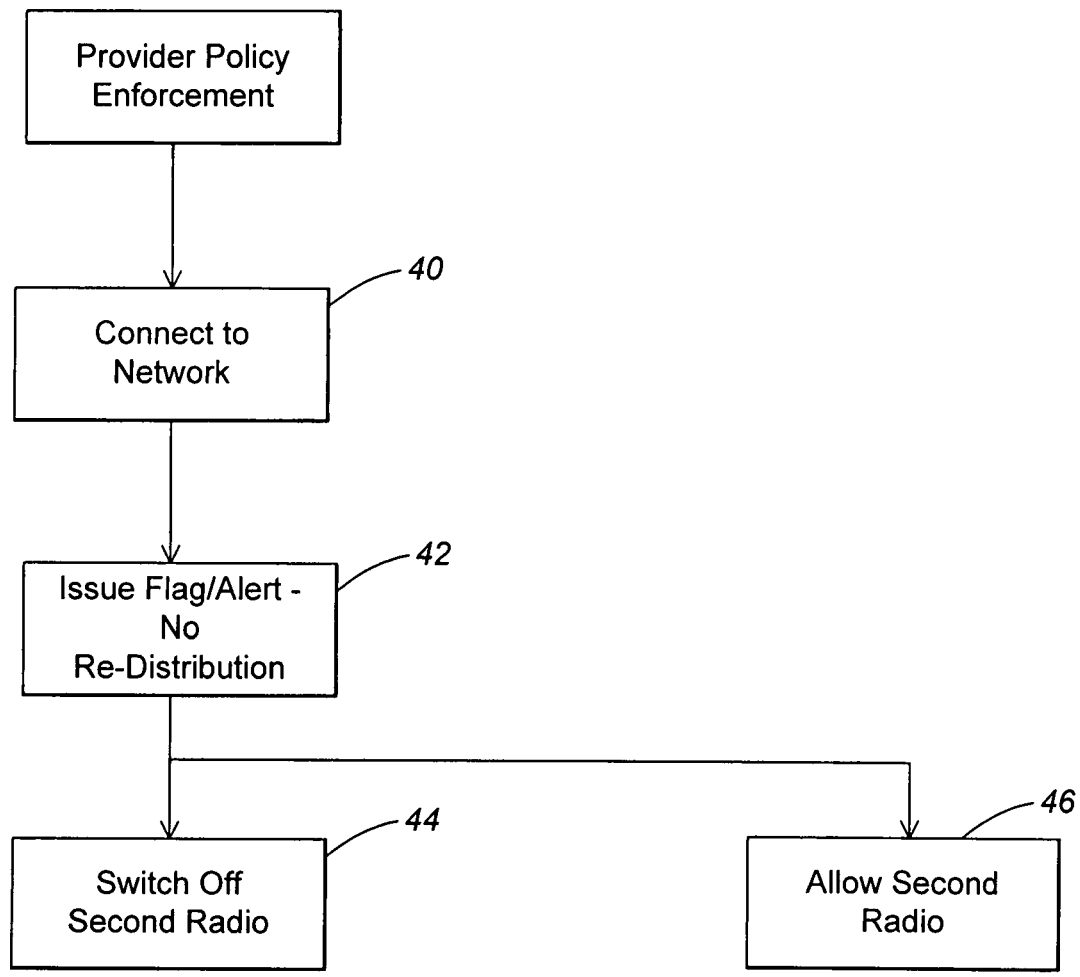
FIG. 2 is a flowchart of an illustrative process for a Provider policy enforcement.

In one embodiment, as shown in the exemplary process of FIG. 2, when the user connects to a network shown at Block 40, such as to Sprint data network, a network initiated instruction can be sent to the wireless device indicating that this connection should not be redistributed, as shown at Block 42. In one embodiment, the user that receives this indication will be automatically blocked from redistributing the connection. This can be implemented in any suitable manner, as the present invention is not limited in this respect. In one embodiment, the instruction or blocking algorithm may be pushed to the user's wireless device upon connection to the network as part of association and handshake profile. Thus, the information provided is that no sharing via another radio is allowed. The algorithm can also switch off the other radio(s), as shown in Block 44. For example, a user may log on to a pay site and enter credit card information that can be charged and the user is then able to access the network. As part of the Institute of Electrical and Electronics Engineers' (IEEE) 802.1 standard exchanges, the network provider may push down the algorithm that locks out the second radio or disables all other radios on the wireless device.

As such, according to an aspect of the invention, a provider is protected against users connecting through to their network without paying for the service. In this regard, the use of simultaneous radio is blocked, where the second radio would have been used to share the wireless connection of the primary or first radio to the network.

It should be appreciated that the present invention is not limited to a user trying to connect her own wireless device to the service provider's network via another user's connection. Instead, the service provider may loan out the wireless device and in which case, the loaner device may have the policy control pre-loaded so that the user is not able to access the network through someone else's connection.

Further, there may be instances where allowing another user to access the network through the primary user's wireless connection may be desirable or allowed. In such a situation, according to an aspect of the invention, as part of the handshake, such permission to allow the second radio connection may be enabled, as shown at Block 46. This could be due to the user paying an additional charge to allow this or can be based on other constraints, such as time, bandwidth, etc. Other arrangements and reasons for allowing a second user to access the network via a primary user's connection may be employed or apparent, as the present invention is not limited in this respect.

Figure 3:
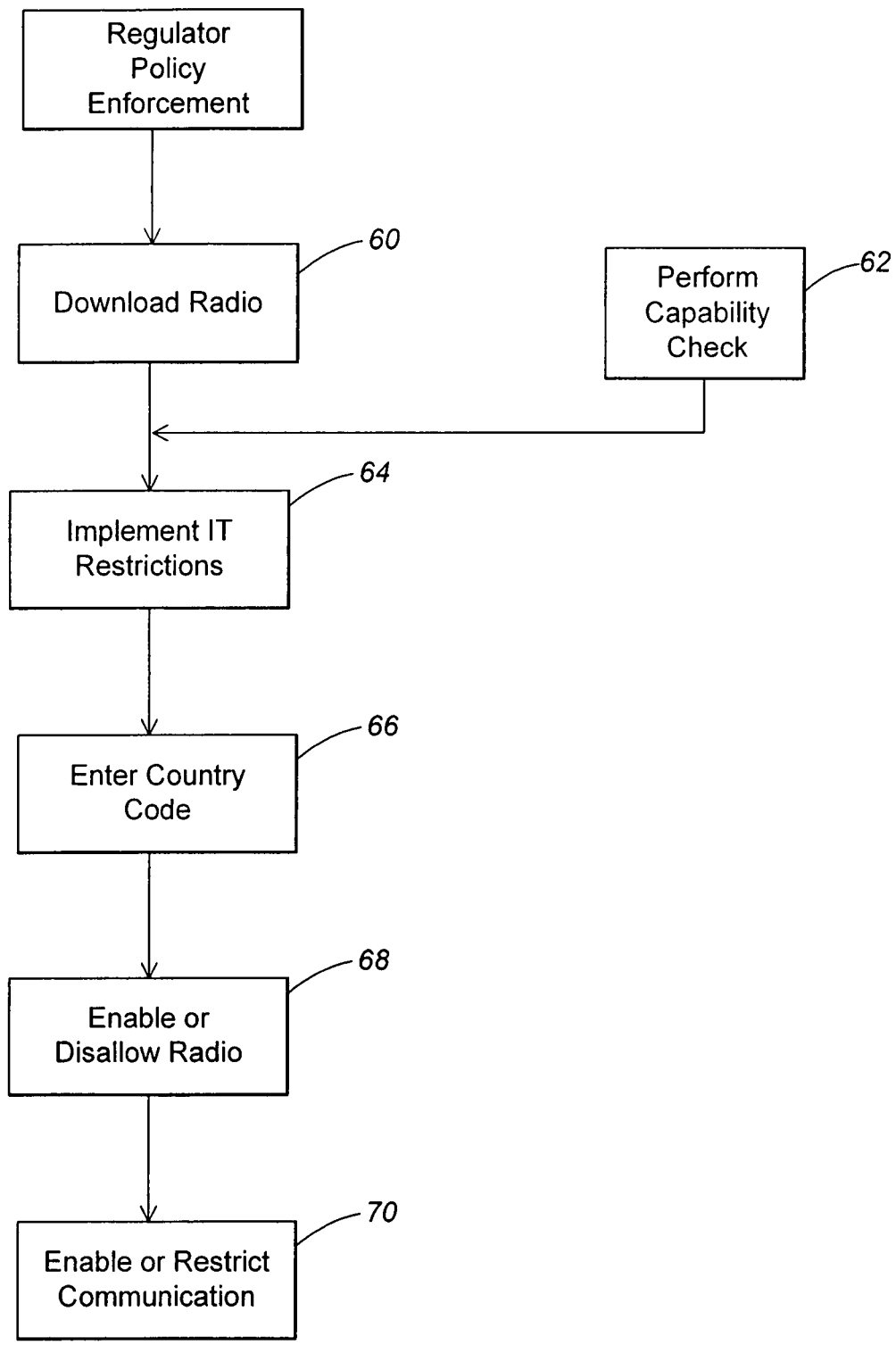
FIG. 3 is a flowchart of an illustrative process for Regulator policy enforcement.

According to another aspect of the invention, restrictions on wireless communication may be initiated by a regulatory group or a government agency. Take, for example, when a laptop is purchased in a country whereby the initial set-up or profiling of the laptop is aligned with the regulatory requirements in that country. That is, a PC purchased and configured for the US market likely will not include a Japanese WAN card. Thus, as shown in FIG. 3 at Block 60, the user will attempt to download the radio and perform a capability check at Block 62 as desired, as discussed above. Also, the restrictions brought on by the IT group and the network service provider may also be implemented, as shown at block 64. At this point, according to one embodiment, the user will be prompted for the country she is residing in, as shown at Block 66. In this case, when the user downloads multiple radios, the wireless device will first download the radios that conforms to the regulatory situation in the country (e.g., because different countries may have different power levels). Alternatively, the user might be alerted that, because the device was profiled as a US device, for example, the radio attempting to be downloaded may not be allowed, as shown at Block 68. In one example, the device may download the radio, but the radio may not be enabled, or the use of the radio may be restricted, as shown at Block 70.

In another example, the wireless device might be allowed to download any radio and that a compliance engine may be required to use a particular radio in a given country. For example, with the Institute of Electrical and Electronics Engineers' (IEEE) 802.11 standard, there is a protocol termed called 802.11D, where D is a country code of the country if the network the wireless device is communicating with. Thus, if the user is on a WiFi network in Japan, and the particular 802.11D is implemented, the regulatory data residing on the wireless device may get updated. In this regard, the regulatory control is used to restrict the software defined multi-radio system as to how the wireless communication ought to be restricted based that country's requirements. Of course, the wireless device might be automatically updated. For example, assume the user transports her wireless device from the US to Japan. Upon start-up, the device recognizes there is a common channel (e.g., a 2.4 GHz unlicensed band), and upon connection, the regulatory control module gets updated with the regulatory domain of Japan. In this example, the user would be prevented from using the basic GSM network, but would be allowed to use wideband CDMA. Alternatively, the user might not be able to use ultra-wideband communications at 3.5 GHz, for example, or other certain frequencies.

In some embodiments, regulatory control may be implemented to restrict the use of multi-radios. In this regard, if the wireless communication would otherwise exceed the power and bandwidth protocols or requirements, then the regulators may desire to regulate the communication so that only a single radio is allowed or that multiple radios with more limited constraints are employed.

It should be appreciated that this regulatory control policy need not be limited to only situations where multi-radio is being used. Rather, the regulatory control policy may be implemented even for a single radio communication, as the present invention is not limited in this respect.

In embodiments where multi-radio is employed, the two radios used simultaneously may exceed the power requirements. For example, an unlicensed band at 2.4 GHz (or future unlicensed bands like 60 GHz) certain power limitations may be required. Having multiple radios that operate in the same band could mean that the communication would exceed certain limits and allowing the regulatory authority to prevent this might be desirable and thus the requirement for regulatory control may be implemented on the wireless device.

The regulatory domain can be obtained in any suitable manner, as the present invention is not limited in this respect. In one embodiment, the user may access a common channel and query its regulatory domain. Alternatively, the user's wireless device may passively listen to transmissions and thereafter the device can automatically determine where it is and then download the regulatory requirement for that location/country. In one embodiment, the user can be altered to the local regulatory control via connection to a local cellular network. In this regard, the cellular network is employed to determine the current locality and then apply the correct regulatory requirements for that locale. Another example is the use of GPS data. Once the locality is know, the proper regulatory control may be downloaded.

It should be appreciated that the regulatory data may already be installed on the wireless device and the use of the GPS or cellular network to determine the particular locality of the wireless device so that then the user can just initiate the pre-installed regulatory control based on the locale of the wireless device.

It should be appreciated that any of the above-noted and other policy enforcement schemes can be performed automatically, semi-automatically or completely manually, as desired. In this regard, the user may have complete control over the wireless device and how the enforcement policies are implemented on his wireless device. Alternatively, the wireless device may be programmed to initiate a sequence of instructions or protocols that addresses the above-noted policy enforcement automatically and in some embodiments, even transparent to the user.

In one illustrative example, suppose a user desires to use WiFi and cellular together on her wireless device (e.g., laptop). The user obtains software either stored in some portable memory device or by downloading the files and in one embodiment, the Operating System (OS) enables the SDR by downloading an executable file off the Internet (e.g., WindowsLive™, Amazon.com™, etc.). In this example, the user desires cellular connection for certain tasks and at the same time, wants to be able to be connected to the Internet to do some other tasks via WiFi, for example. The user may go to WindowsLive™ and click on, e.g., "connections" and "download WiFi". Upon this request, according to an aspect of the invention, the wireless device may perform the policy control protocol(s) as discussed above. Continuing with this illustrative example, for cellular access, the user may access the same or a similar website to download the cellular access software, which may include any particular type of cellular protocol, such a wideband CDMA or WCDMA. When the user attempts to connect via one or both radios, the device may limit the accessibility based on the above-noted policy controls.

Figure 4:
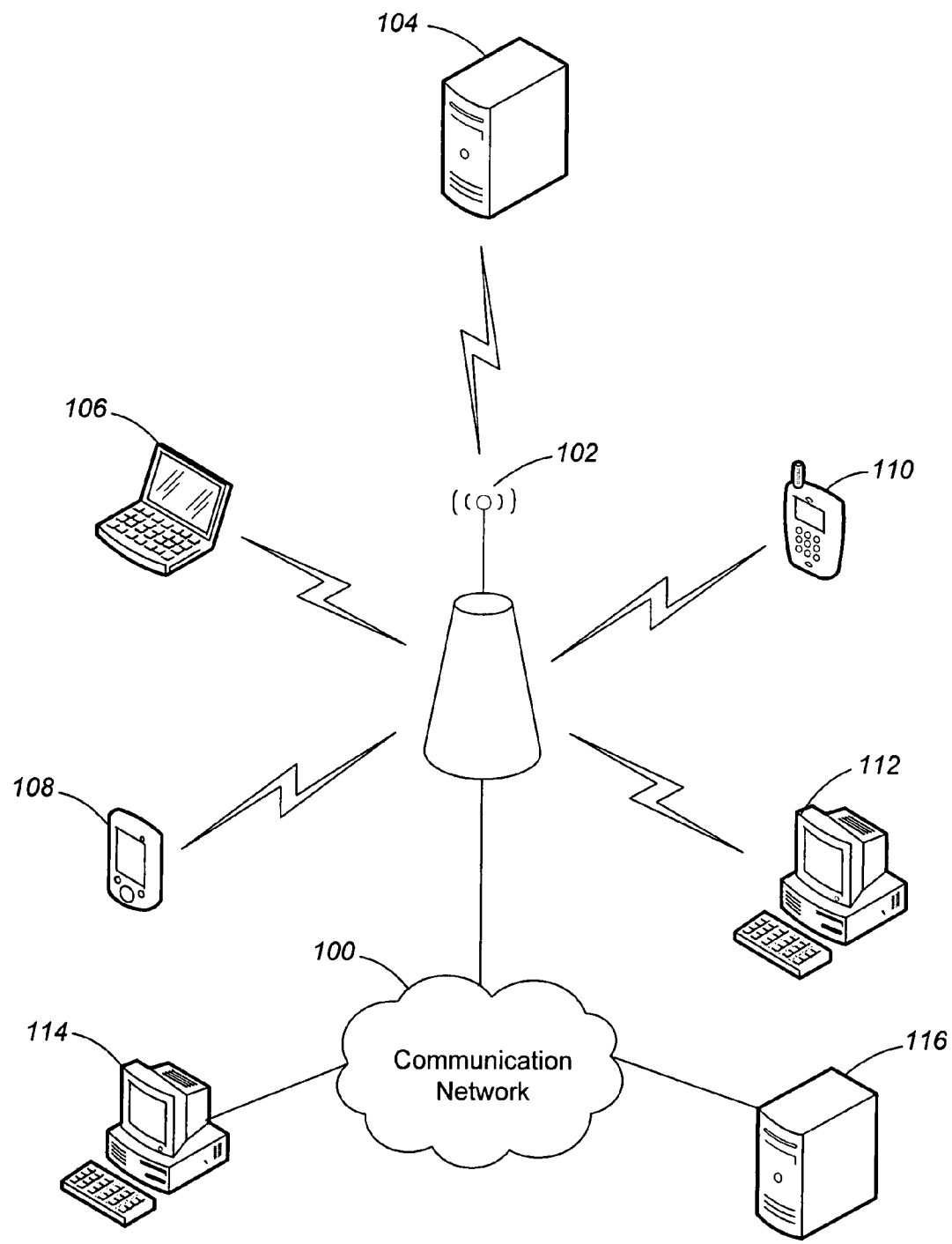
FIG. 4 is a diagram of an illustrative computer system environment in which embodiments of the invention may be implemented.

The aspects of the present invention described herein can be implemented on any of numerous computer system configurations and are not limited to any particular type of configuration. FIG. 4 illustrates one example of a computer system on which aspects of the invention can be implemented, although others are possible.

The computer system of FIG. 4 includes communication network 100, wireless access point 102, wireless computing devices 104-112, and wired computing devices 114 and 116. Communication network 100 can be any suitable communication medium or media for exchanging data between two or more computers (e.g., a server and a client), including the Internet. The wireless client devices can be any suitable computing device with wireless communication capabilities. Several exemplary mobile computing devices are shown, including laptop 106, personal digital assistant 108, and smart phone 110. In addition, typically stationary devices can be enabled for wireless communication, such as server 104 and computer terminal 112. Each of these mobile and stationary devices is in a state of, or capable of being in a state of, wireless communication with wireless access point 102 connected to communication network 100. This wireless communication allows the computing devices to exchange data with one another or, through communication network 100, with wired devices 114 and 116.

As mentioned above, the embodiments of the invention described herein are not limited to being practiced with the exemplary system shown in FIG. 1, and can be employed on systems employing any number of wireless access points and/or computing devices. In addition, while FIG. 4 shows the computing devices in wireless communication with wireless access point 102, it should be appreciated that embodiments of the invention may operate in networks wherein the computing devices communicate with one another directly and not through an access point. Also, while FIG. 4 includes communication network 100 with wired devices 114 and 116, embodiments of the invention can be used in systems that do not include a wired network.

Figure 5:
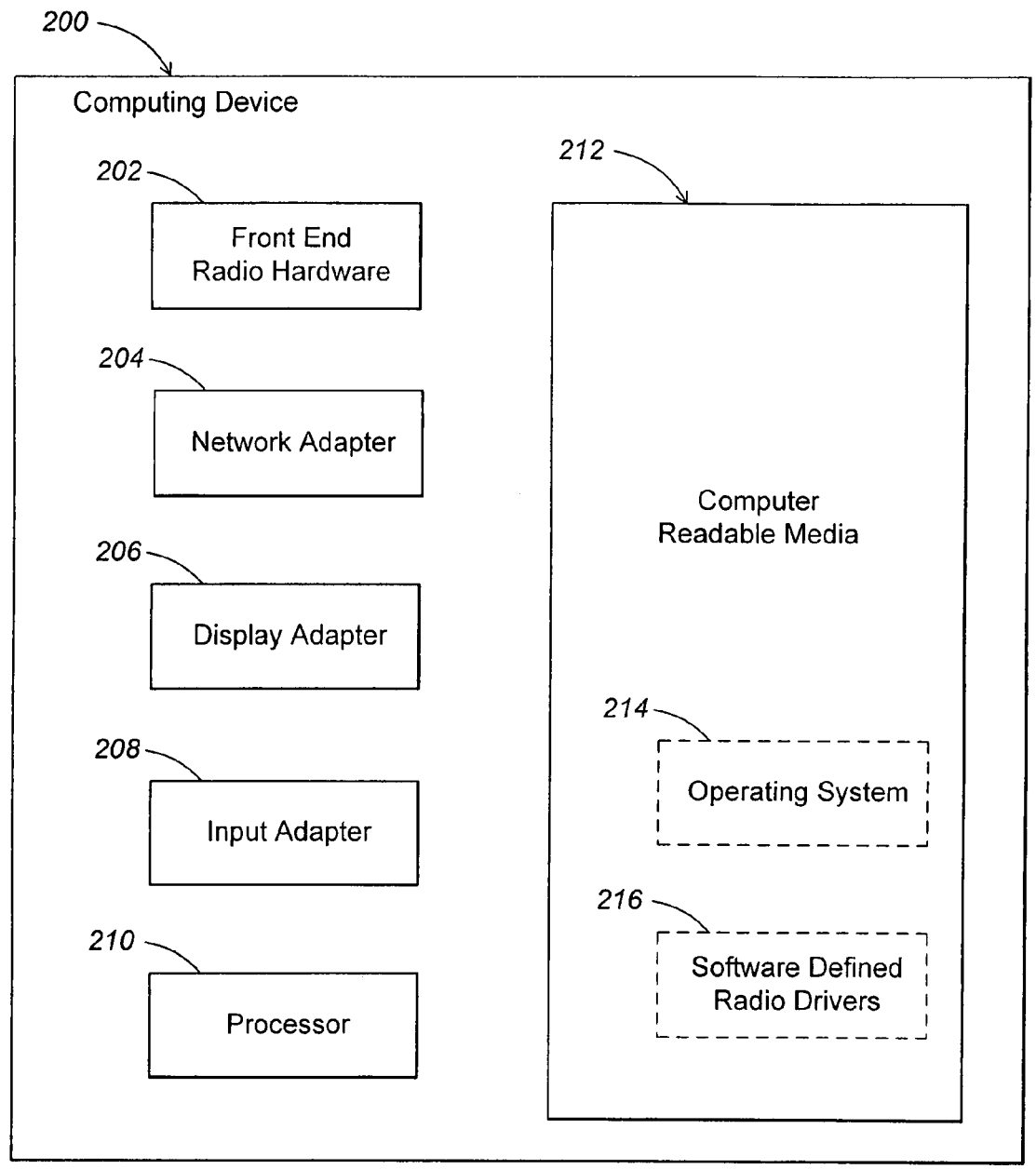
FIG. 5 is an exemplary computing device that may be used in accordance with embodiments of the invention.

FIG. 5 schematically shows an illustrative computing device 200 that may be used in accordance with one or more embodiments of the invention. FIG. 5 is intended to be neither a depiction of necessary components for a computing device to operate with embodiments of the invention nor a comprehensive depiction. Computing device 200 comprises front end radio hardware 202 to communicate wirelessly, e.g., with wireless access point 102 or with other devices. Device 200 also comprises a network adapter 204 to communicate over a computer network using other (possibly non-wireless) methods, a display adapter 206 to display information to a user of the device, and an input adapter 208 to receive commands from the user. Device 200 further comprises computer-readable media 212 for storing data to be processed and/or instructions to be executed by a processor 210. Processor 210 enables processing of data and execution of instructions. The data and the instructions may be stored on the computer-readable media 212 and may, for example, enable communication between components of the computing device 200. The data and instructions may comprise an operating system 214 and software defined radio drivers 216. SDR drivers 216 may comprise data and instructions to carry out many functions typically done in hardware-implemented radios. The functions performed by drivers 216 may complement the functions of front end radio hardware 202, such that all desired functions may be performed by the combination of hardware and software.

Front-end radio hardware 202 may be any suitable radio hardware performing any combination of functions. These functions may include modulation (i.e., mixing a data signal into a high frequency transmission signal), filtering (i.e., parsing data out of a received signal), analog-to-digital or digital-to-analog conversion, signal generation (i.e., transmitting the data), etc. Front-end 202 may be implemented to perform a minimum of the required functions that need to be performed at the hardware level, with the remaining functions being implemented by SDR drivers 216. The present function is not limited to use with systems that decide the responsibilities of the hardware and software in any particular way. Front-end 202 may comprise an antenna, a programmable radio-frequency waveform generator/decoder that spans a wide radio spectrum, an array of fast analog to digital converters, and/or serializers/de-serializers to convert analog data into computer-processable bytes and vice versa. A set of tunable analog filters may also be employed to comply with mandated spectrum masks. These hardware components are merely illustrative, as invention not limited to use on systems having any particular hardware.

SDR drivers 216, in addition to performing radio functions, may transmit control instructions to the tunable circuitry of front-end 202 to customize the hardware of the front-end 202 according to a particular wireless protocol. As one example, a user may have selected to enable communication having a bandwidth of 83 MHz according to the Institute of Electrical and Electronics Engineers' (IEEE) 802.11b standard. As a further example, the front-end 202 may have a configurable bandwidth with a range of 200 KHz to 500 MHz. In this case, the SDR drivers 216 may send a control signal (in any suitable manner) to the waveform generator of front-end 202 to generate signals having, among other characteristics, a total bandwidth one-sixth of the front end's capacity (namely, the 83 MHz established by the IEEE 802.11b standard). It should be appreciated that embodiments of the invention are not limited to use with SDRs that have a configurable bandwidth with the above-desired range, nor to SDRs that configure hardware according to any specific technique, as the embodiments of the invention can be used with SDRs that tune the hardware components in any suitable manner.

It should be appreciated that one embodiment of the invention is directed to use with a computing device having programmable circuitry (e.g., the front end hardware 202 and the SDR drivers 216) that is programmable by control instructions to generate and/or receive signals according to a wireless protocol. Again, this programmable circuitry can take any suitable form and include any collection of directly programmable circuitry (e.g., a programmable processor) and circuitry that interacts with directly programmable circuitry to enable communication according to a wireless protocol.

It should be appreciated that the embodiments of the present invention described herein are not limited to being practiced with the type of computing device illustrated in FIG. 5, and that embodiments of the invention can be practiced with any suitable computing device. The front-end 202 and adapters 204-208 may be implemented as any suitable hardware, software, or combination thereof, and may be implemented as a single unit or multiple units. Similarly, computer-readable media 212 may be implemented as any medium or combination of media for storing data and instructions for access by a processing device.

As discussed above, in one embodiment of the invention, policy enforcement is provided for controlling the accessibility of the wireless communication available to the computing device 200 (e.g., front-end 202 and operating system 214, including SDR drivers 216) either employing single radio or multiple radios simultaneously. It should be appreciated that this enforcement can be done in any suitable manner. Exemplary techniques are disclosed herein, but embodiments of the invention are not limited to any particular implementation technique.

As discussed above, a wireless device, such as a laptop, includes front-end hardware components, such as RF components, ADC and DAC. The wireless device may include these hardware components as a miniPCI, PCIe, PCMCIA or on the mother board. In one embodiment, the front end is characterized by the parameter set: maximum frequency, minimum frequency, maximum RF power, DC bias, frequency response characteristics, tunable bandwidth, and power amplifier non-linearity characterized by the compression ratio.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:
1. A method of using an SDR-enabled wireless device, the method comprising:
  a) initiating a request for wireless communication over a first wireless network using the SDR;
  b) determining whether the requested wireless communication is allowed;
  c) enabling the requested wireless communication when the requested wireless communication is within predetermined allowed criteria;

d) initiating a request for simultaneous wireless communication over a second wireless network using a second SDR;

e) determining whether the requested simultaneous wireless communication is allowed and determining whether the requested simultaneous wireless communication is permitted in combination with the requested wireless communication after the requested wireless communication has been established;

f) enabling the requested simultaneous wireless communication when the requested simultaneous wireless communication is within second predetermined allowed criteria, the second predetermined allowed criteria including enforcement control that determines whether simultaneous existence of the wireless communications is permitted;

g) simultaneously communicating with the first and second wireless networks using the first and second SDRs respectively.

2. The method of claim 1, wherein determining whether the requested wireless communication is allowed comprises receiving criteria about when wireless communication is allowed from a source upon initial communication with the source and comparing the requested wireless communication to the criteria.

3. The method of claim 1, wherein determining whether the requested simultaneous wireless communication is allowed comprises receiving criteria about when simultaneous wireless communication is allowed from a source upon initial communication with the source and comparing the requested simultaneous wireless communication to the criteria.

4. The method of claim 1, further comprising obtaining the enforcement control from a corporate IT group.

5. The method of claim 1, further comprising obtaining the enforcement control from a service provider.

6. The method of claim 1, further comprising obtaining the enforcement control from a regulatory group.

7. The method of claim 1, further comprising allowing unrestricted wireless communication when the requested wireless communication is within the predetermined allowed criteria.

8. The method of claim 1, further comprising allowing restricted wireless communication when the requested wireless communication is not within the predetermined allowed criteria.

9. The method of claim 8, further alerting a user of the wireless device that wireless communication is restricted to certain constraints.

10. The method of claim 1, further comprising automatically blocking redistribution of a wireless connection when the requested simultaneous wireless communication is not within the second predetermined allowed criteria.

11. The method of claim 1, further comprising automatically disabling a second SDR when the requested simultaneous wireless communication is not within the second predetermined allowed criteria.

12. The method of claim 6, wherein obtaining the enforcement control from a regulatory group comprises obtaining the enforcement control automatically upon wireless communication with a network that is regulated by the regulatory group.

13. The method of claim 12, wherein obtaining the enforcement control from a regulatory group comprises allowing a user to enter a country code into the wireless device.

14. The method of claim 12, wherein obtaining the enforcement control from a regulatory group comprises automatically entering GPS data into the wireless device.

15. A method of using an SDR-enabled wireless device, the method comprising:

a) communicating with a first wireless network with a first SDR;

b) thereafter initiating a request for simultaneous wireless communication with a second network using a second SDR;

c) determining whether the requested simultaneous wireless communication is allowed and determining whether communicating with the second wireless network is permitted in combination with communicating with the first wireless network after the requested wireless communication has been established;

d) enabling the requested simultaneous wireless communication when the requested simultaneous wireless communication is within predetermined allowed criteria, the predetermined allowed criteria including enforcement control that determines whether simultaneous existence of the wireless communications is permitted; and e) simultaneously communicating with the second wireless network using the second SDR.

16. The method of claim 15, further comprising automatically disabling at least one second SDR when the requested simultaneous wireless communication is not within the second predetermined allowed criteria.

17. A computer system, comprising:
programmable circuitry;
software encoded on at least one computer-readable medium to program the programmable circuitry to implement a software defined radio;
a verification module encoded to enable wireless communication when the wireless communication is within predetermined allowed criteria wherein the verification module is encoded to enable simultaneous wireless communication over first and second wireless networks when the simultaneous wireless communication is within the predetermined allowed criteria and when the simultaneous wireless communication is permitted in combination with the wireless communication after the requested wireless communication has been established, the predetermined allowed criteria including enforcement control that determines whether simultaneous existence of the wireless communications is permitted.

* * * * *